3,200,189
CONDUCTOR BEND RELIEF
Dean W. Flygstad, Roseville, Minn., assignor to The Telex Corporation, Tulsa, Okla., a corporation of Delaware
Filed May 7, 1963, Ser. No. 278,566
4 Claims. (Cl. 174—70)

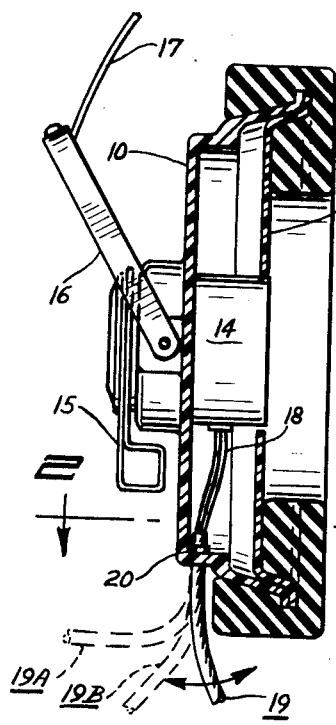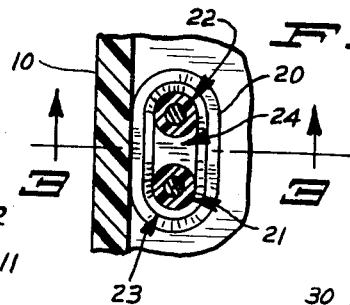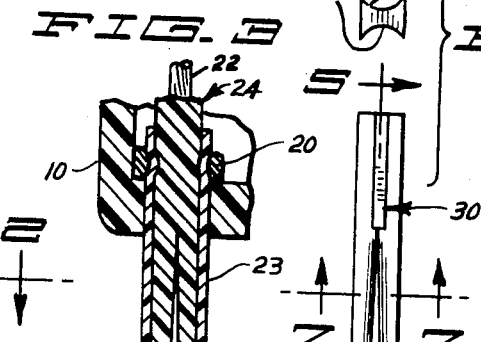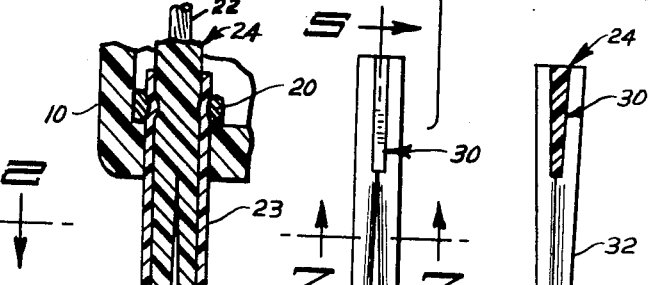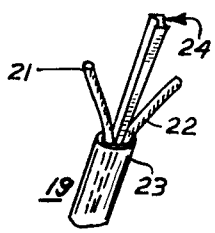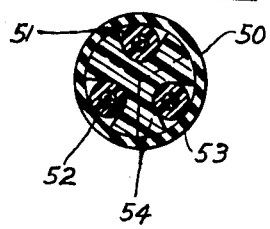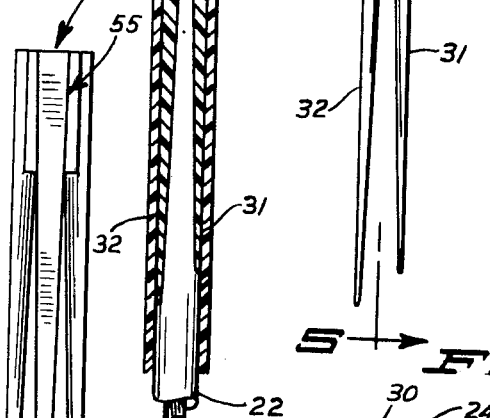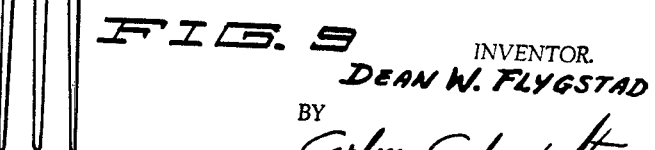
Aug. 10, 1965     D. W. FLYGSTAD     3,200,189
CONDUCTOR BEND RELIEF
Filed May 7, 1963
INVENTOR.
DEAN W. FLYGSTAD United States Patent Office 3,200,189
Patented Aug. 10, 1965

This invention is directed to an article for use in combination with electrical cables and is more particularly directed to an article which may be easily inserted into a cable assembly for limiting the radius of bending or flexure of the cable in the areas wherein failure from such wear occurs.

In the prior art with which my invention is concerned, there exists a problem of short life of multiconductor electric cable due to stresses and strains occasioned by flexure of the cable at its entrance into an electrical device or apparatus. The actual life of such cables is determined to a large extent by the radius of curvature of bends that occur upon flexure of the cable and to a certain extent upon various economic factors involved in the construction, and the material used, in manufacturing the cable. Cables used to provide similar functions can vary widely in cost and in life and it has been determined that there is a correlation between low cost and short life. It has further been determined that were it not for the early failure of the cables at the point of attachment to electrical apparatus, the flexure and bending stresses and strains to which the cable is likely to be subjected over the remainder of its length do not occur often enough in the same spot so as to cause failure of the cable assembly through breakage of one or more of the conductors. The problem of short life has been observed to be accentuated in cable assemblies wherein conductors having a concentric shield surrounding a central conductor are utilized.

The prior art has attempted to overcome early failure of cable assemblies through the use of grommets and externally mounted devices which are intended to limit the radius of curvature of a bend in the cable and have, in some cases, proven successful in extending the life of a cable assembly in actual use.

In my invention I provide an article for insertion inside of the sheath, or jacket, of a multiconductor cable assembly which consists of a plurality of longitudinally elongated, tapered members which are fastened together at the large ends thereof and are suitably configured so that the article may be inserted into a cable assembly before or at the time it is placed in, for instance, an opening in an electrical device to limit the cable assembly in flexure or bending, in proximity to the opening therefor, to a radius which will not cause failure of the cable assembly or any component thereof. Further, the article is suitably dimensioned so that a retaining ring may be suitably clamped to the cable assembly without crushing or otherwise damaging the conductors within. My bend relief may be economically manufactured and easily assembled into cables to provide a large increase in the life of any cable assembly comprised of a sheath and a plurality of conductors which are positioned parallel to one another at least over the length of cable that is subject to extreme stresses and strains due to flexure or bending.

It is therefore an object of my invention to provide an improved device for insertion into electrical cable assemblies for limiting the bending thereof.

It is a further object of my invention to provide a device for insertion into electrical cable assemblies to limit the bending thereof which may be economically manufactured and easily assembled.

A still further object of my invention is to provide an improved bend relief for insertion into electrical cable assemblies.

A still further object of my invention is to provide a bend relief device for use with inexpensive electrical cable assemblies to tend to prevent destructive failure thereof in areas that bending or flexure is normally present.

These and other more detailed and specific objects will be disclosed in the course of the following specification, reference being had to the accompanying drawings, in which—

FIG. 1 is a sketch of an earphone as might be embodied in a communications headset as an example of an electrical device to which my invention may be applied.

FIG. 2 is an enlarged fragmentary drawing taken along the section line 2—2 on FIG. 1.

FIG. 3 is an enlarged sectional view of an embodiment of my invention taken along section line 3—3 in FIG. 2.

FIG. 4 is an elevation and top view of one embodiment of my invention.

FIG. 5 is a sectional view taken along section line 5—5 in FIG. 4.

FIG. 6 is a further sectional view taken along section line 7—7 in FIG. 4.

FIG. 7 is a sketch showing the embodiment of FIGS. 2, 3, 4, 5 and 6 partially inserted into a cable assembly.

FIG. 8 is a sectional view of a cable assembly and a further embodiment of my invention therein.

FIG. 9 is a side elevation drawing of the embodiment shown in FIG. 8.

In FIG. 1 of the drawing there is shown a representation of a conventional earphone assembly which is comprised of a housing 10 to which is attached a bracket 16 and a support member 17 which is adapted to be attached to a frame for engagement with the head of an operator to support the earphone in sound transmission relationship with the ear of an operator. A clip member 15 is mounted on the left end of housing 10 and may be utilized, for example, to support a microphone assembly. A cover member 11 to which is attached a transducer 14, normally in the form of a loudspeaker, is positioned over housing 10 to define a chamber therein and a pad 12, shown utilized to maintain housing 10 and cover member 11 in engagement, is positioned around the periphery thereof and may be comprised of suitable soft material for engagement with the head of an operator. A cable 19 containing an appropriate number of electrical conductors 18 extends through a suitable opening therefor in the lower part of housing 10 and the sheath of the cable is terminated at this point while the conductors 18 extend upwardly to transducer 14 and are electrically connected thereto to complete a circuit from a suitable source of electrical energy (not shown) which may be, for example, a radio. Cable 19 may be fastened in place through the use of a grommet, or metal ring, 20 which serves to anchor and suspend cable 19 in the illustrative embodiment. Cable 19 is shown in two positions of flexure by the phantom outlines 19A and 19B and an arrow is shown on cable 19 to indicate that it is normally continually flexed, or bent, at its point of entry through the opening in housing 10 to the earphone assembly. It may further be noted that in the illustrative embodiment, it is desirable to have a flexible cable for the convenience of the operator. It may also be noted that in order to have a cable that is sufficiently flexible so as not to interfere with the operator, flexure or bends indicated by the reference character 19A are likely to occur whereas a desirable limit of bending is indicated by the reference character 19B. Therefore, in order to provide the desirable flexibility of the entire cable, a severe sacrifice is made in the life of the cable due to the small radius of flexure in bending which may occur in proximity to the entrance to the electrical device, or earphone.

Referring now to FIGS. 2, 3, 4, 5, 6 and 7 in which like reference characters have been applied to like elements of the embodiment shown, my invention is indicated generally by the reference character 24, and includes a pair of elongated tapered portions, or members 31 and 32 which are provided with a gradually decreasing cross sectional area from one end to the other, from the upper to the lower ends. Members 31 and 32 are interconnected at the largest ends thereof as indicated by the reference character 30 and the shape and size of the top end of the embodiment is such that it will engage the inside of a cable sheath or jacket 23 and a pair of conductors 21 and 22 so that the sheath 23 is completely filled. As shown in FIGS. 2 and 3, a metallic ring 20 is crimped onto the cable assembly at the point that it enters the interior of housing 10. Metallic ring 20 may engage a substantial portion of bend relief 24 at its top end and as such tends to prevent undue pressure on conductors 21 and 22 and, of course, does provide an assembly which is unlikely to fail under actual use due to slippage between cable sheath 23 and ring member 20. The triangular cross section of members 31 and 32 provided successful results in the embodiment shown, but it will be understood that other configurations may occur to those skilled in the art upon becoming familiar with the principles of my invention and the preferred embodiment is shown by way of illustration only. It should also be noted that members 31 and 32 may also be of different lengths to facilitate insertion of bend relief 24 into a cable assembly.

Bend relief 24 may be constructed of any material having suitable insulating properties and mechanical stiffness and flexibility characteristics. In one successful embodiment, nylon plastic proved to be a satisfactory material. Upon becoming familiar with the principles of my invention, one skilled in the art may readily determine through experimentation and experience the characteristics of suitable materials for any given application of my invention.

In the embodiment shown in FIGS. 8 and 9, a cable sheath 50 is shown surrounding three conductors 51, 52, and 53 and a bend relief 54. In FIG. 9, it will be noted that bend relief 54 is comprised of a plurality of longitudinally elongated members 56, 57, and 58 which may be triangular in cross section and taper from a small cross section to a relatively large cross section from the bottom to the top thereof and are positioned so that the outside surfaces are substantially parallel for engagement with the jacket 50 and with the apex of the triangular cross section extending inwardly of the members. Members 56, 57 and 58 are connected or joined at the largest ends as indicated generally by reference character 55. Again it will be noted that the top end of bend relief 54 is suitably dimensioned and shaped to engage conductors 51, 52, and 53 and the inside surface of cable sheath 50 so that the assembly substantially fills the inside of sheath 50.

In one operative embodiment of my invention, the insertion of bend relief member 24 materially increased the radius of bends occurring in proximity to the entrance of an earphone as shown in FIG. 1 and provided a large increase in the life of the cable while allowing the use of an inexpensive cable so as to substantially reduce the cost of manufacturing the earphone.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A bend relief for insertion into a multiconductor sheathed cable assembly comprised of a plurality of longitudinally elongated members, each of said members having a substantially triangular cross section and being of small cross section at one end and gradually increasing in cross section along the longitudinal length thereof, said members being interconnected at the ends of largest cross section so that the apex of said triangular cross section extends inwardly thereof and so as to engage and position conductors in a cable so that the conductors are separated by the interconnected ends of said members and the conductors and the interconnected ends of the members substantially fill the inside of a cable sheath surrounding said interconnected members and said conductors.

2. The article of claim 1 in which the longitudinally elongated members are of different lengths.

3. In combination with a jacketed multiconductor, cable, a bend relief member disposed in the end of said cable to prevent flexure failure of conductors comprising, a body portion disposed at the end extremity of the jacket of said cable and a plurality of longitudinally elongated flexible members of substantially triangular cross section and of gradually decreasing cross sectional area, said flexible members being disposed to provide an outer jacket engaging surface whereby the apex of the triangular cross section extends inwardly of the jacket of said cable, said flexible members extending into said cable from said end extremity.

4. The apparatus of claim 3 in which the longitudinally elongated members are tapered.

References Cited by the Examiner

UNITED STATES PATENTS

| 1,376,068 | 4/21 | Benjamin | 339—103 |
| 2,662,219 | 12/53 | Hennessey et al. | 339—103 |
| 3,095,468 | 6/63 | Klein | 174—138 X |

FOREIGN PATENTS

| 840,120 | 5/52 | Germany. |
| 876,293 | 8/61 | Great Britain. |

LARAMIE E. ASKIN, *Primary Examiner.*

JOHN P. WILDMAN, *Examiner.*